(12) United States Patent
Abdulhayoglu et al.

(10) Patent No.: US 11,423,140 B1
(45) Date of Patent: Aug. 23, 2022

(54) AUTO-CONTAINMENT OF GUEST USER APPLICATIONS

(71) Applicants: Melih Abdulhayoglu, Montclair, NJ (US); Ilker Simsir, Woodland Park, NJ (US)

(72) Inventors: Melih Abdulhayoglu, Montclair, NJ (US); Ilker Simsir, Woodland Park, NJ (US)

( * ) Notice: Subject to any disclaimer, the term of this patent is extended or adjusted under 35 U.S.C. 154(b) by 188 days.

(21) Appl. No.: 15/936,391

(22) Filed: Mar. 26, 2018

Related U.S. Application Data

(60) Provisional application No. 62/477,413, filed on Mar. 27, 2017.

(51) Int. Cl.
*G06F 21/53* (2013.01)
(52) U.S. Cl.
CPC ...... *G06F 21/53* (2013.01); *G06F 2221/2149* (2013.01)
(58) Field of Classification Search
CPC .......................... G06F 21/53; G06F 2221/214
See application file for complete search history.

(56) References Cited

U.S. PATENT DOCUMENTS

| | | |
|---|---|---|
| 7,389,427 B1 | 6/2008 | McKeen et al. |
| 7,647,589 B1 | 1/2010 | Dobrovolskiy et al. |
| 7,694,328 B2 | 4/2010 | Joshi et al. |
| 7,793,338 B1 | 9/2010 | Beddoe et al. |
| 7,818,808 B1 | 10/2010 | Neiger et al. |
| 7,836,188 B1 * | 11/2010 | Dodrill ................... H04L 67/02 709/227 |
| 8,090,797 B2 | 1/2012 | Chinta et al. |

(Continued)

FOREIGN PATENT DOCUMENTS

| | | |
|---|---|---|
| CA | 2973882 A1 | 2/2018 |
| EP | 2750069 A1 | 7/2014 |
| WO | 2018008024 A1 | 1/2018 |

OTHER PUBLICATIONS

Thomas Blasing, Leonid Batyuk, Aubrey-Derrick Schmidt, Seyit Ahmet Camtepe, Sahin Albayrak An Android Application Sandbox system for suspicious software detection Malicious and Unwanted Software (MALWARE), 2010 5th International Conference Oct. 19-20, 2010.

(Continued)

*Primary Examiner* — Techane Gergiso
(74) *Attorney, Agent, or Firm* — Joseph P. Aiena

(57) ABSTRACT

There are provided methods and systems for providing security on endpoints which are used on environment where temporary user access is needed without any session persistence. When a file is requested to be executed on any endpoint, the execution source would be checked for user information. If the file execution is requested by guest and/or pre-configured user accounts or any of the parent process is launched by guest and/or pre-configured user accounts, it is launched inside the secure container to isolate the all resource usage of that application from the rest of the system and user applications. This achieves the isolated data and application execution between temporary session/user files and persistent or system users session files. It enables a secure computing environment on an endpoint for shared and temporary user access enabled endpoints.

9 Claims, 11 Drawing Sheets

(56) References Cited

U.S. PATENT DOCUMENTS

| | | | |
|---|---|---|---|
| 8,239,915 B1 | 8/2012 | Satish et al. | |
| 8,327,354 B1* | 12/2012 | Magenheimer | G06F 9/45554 |
| | | | 718/1 |
| 9,274,974 B1 | 3/2016 | Chen et al. | |
| 9,438,618 B1 | 9/2016 | Sultan et al. | |
| 2003/0014466 A1 | 1/2003 | Berger et al. | |
| 2004/0075679 A1 | 4/2004 | Carter et al. | |
| 2006/0021029 A1 | 1/2006 | Brickell et al. | |
| 2008/0208374 A1* | 8/2008 | Grgic | G05B 17/02 |
| | | | 700/83 |
| 2008/0244685 A1* | 10/2008 | Andersson | H04L 69/329 |
| | | | 726/1 |
| 2008/0320474 A1* | 12/2008 | Jelinek | G06F 9/455 |
| | | | 718/1 |
| 2009/0265756 A1 | 10/2009 | Zhang et al. | |
| 2009/0328181 A1* | 12/2009 | Ye | H04L 41/5054 |
| | | | 726/9 |
| 2010/0005531 A1* | 1/2010 | Largman | G06F 21/53 |
| | | | 726/24 |
| 2010/0115585 A1* | 5/2010 | Cohen | G06F 9/547 |
| | | | 726/3 |
| 2010/0175104 A1 | 7/2010 | Khalid | |
| 2011/0145926 A1 | 6/2011 | Dalcher et al. | |
| 2011/0296487 A1 | 12/2011 | Walsh | |
| 2012/0066759 A1 | 3/2012 | Chen et al. | |
| 2012/0110337 A1 | 5/2012 | Murphey et al. | |
| 2012/0246487 A1* | 9/2012 | Gu | G06F 21/51 |
| | | | 713/190 |
| 2013/0332618 A1* | 12/2013 | Kasivajjula | H04L 67/142 |
| | | | 709/228 |
| 2014/0189690 A1* | 7/2014 | Ramakrishnan Nair | |
| | | | G06F 9/461 |
| | | | 718/1 |
| 2014/0282501 A1* | 9/2014 | Zeng | G06F 21/44 |
| | | | 718/1 |
| 2015/0033072 A1* | 1/2015 | Barr | G06F 11/1484 |
| | | | 714/15 |
| 2016/0055016 A1* | 2/2016 | Beveridge | G06F 9/4451 |
| | | | 718/1 |
| 2016/0147998 A1* | 5/2016 | Hutton | G06F 21/577 |
| | | | 726/25 |
| 2017/0093922 A1* | 3/2017 | Duan | H04L 45/306 |
| 2017/0093923 A1* | 3/2017 | Duan | G06F 11/2028 |
| 2017/0293498 A1* | 10/2017 | Gulam | G06F 9/44521 |
| 2018/0027007 A1* | 1/2018 | Shah | G06F 21/53 |
| | | | 726/22 |
| 2018/0074814 A1* | 3/2018 | Ganta | G06F 21/6218 |
| 2018/0114025 A1* | 4/2018 | Cui | G06F 21/577 |
| 2018/0139238 A1* | 5/2018 | Schultz | H04L 63/1491 |
| 2018/0157517 A1* | 6/2018 | Dong | G06F 9/5077 |
| 2018/0285139 A1* | 10/2018 | Shapira | G06F 9/45558 |
| 2018/0349629 A1* | 12/2018 | Chenchev | G06F 21/568 |
| 2019/0138715 A1* | 5/2019 | Shukla | G06F 9/541 |
| 2019/0294779 A1* | 9/2019 | Suneja | G06F 9/45545 |

OTHER PUBLICATIONS

Bryan D.Payne, Martim Carbone, Monirul Sharif, Wenke Lee Lares: An Architecture for Secure Active Monitoring Using Virtualization Security and Privacy, 2008. SP 2008. IEEE Symposium May 18-22, 2008; Publisher: IEEE; Conference Location: Oakland, CA, USA.

Ying Zhang Virtualization and Cloud Computing Publisher: Wiley-IEEE Press; Ed. 1; p. : 192; (2018).

Vivek Vijay Sarkale, Paul Rad, Wonjun Lee Secure Cloud Container: Runtime Behavior Monitoring Using Most Privileged Container (MPC) Published in: Cyber Security and Cloud Computing (CSCIoud), 2017 IEEE 4th International Conference on Date of Conference: Jun. 26-28, 2017; Publisher: IEEE Conference Location: New York, NY, USA.

\* cited by examiner

Task Manager

| File | Options | View |
|---|---|---|

| Processes | Performance | App history | Startup | Users | Details | Services |
|---|---|---|---|---|---|---|

| Name | PID | Status | User Name | CPU | Memory | Description |
|---|---|---|---|---|---|---|
| AlertService.exe | 8992 | Running | PC1 | 00 | 784K | Alert Service App |
| SysMode.exe | 2028 | Running | PC1 | 01 | 3,400K | System Detection App |
| AsiHKService.exe | 9428 | Running | PC1 | 00 | 844K | Tool to handle app key |
| AsSysLeveUpSrc.exe | 10356 | Running | PC1 | 00 | 1,268K | ASUS Sys Level Up Newe Src |
| ASUS_Mgr Ligh... | 16220 | Running | PC1 | 00 | 1,012K | ASUS_Mgr_Lighting |
| atkexComSvc.exe | 7892 | Running | SYSTEM | 00 | 2,340K | atkexComSvc |
| audiodg.exe | 13724 | Running | LOCALSVC | 00 | 5,248K | Windows Audio Dev Graph Iso. |
| backgroundTaskHos... | 14476 | Suspended | PC1 | 00 | 27,696K | Background Task Host |
| cavwp.exe | 4704 | Running | SYSTEM | 00 | 9,472K | COMODO Client-Security |
| chrome.exe | 14948 | Running | PC1 | 00 | 72,928K | Google Chrome |
| chrome.exe | 13140 | Running | PC1 | 00 | 1,792K | Google Chrome |
| chrome.exe | 1872 | Running | PC1 | 00 | 1,724K | Google Chrome |
| cis.exe | 13836 | Running | PC1 | 00 | 864K | COMODO Client-Security |
| cistray.exe | 15024 | Running | PC1 | 00 | 1,816K | COMODO Client-Security |
| cmdagent.exe | 1628 | Running | SYSTEM | 00 | 22,676K | COMODO Client-Security |
| conhost.exe | 2444 | Running | SYSTEM | 00 | 1,368K | Console Windows Host |
| csrss.exe | 748 | Running | SYSTEM | 00 | 984K | Client Server Runtime Process |
| dasHost.exe | 2276 | Running | LOCALSVC | 00 | 1,496K | DevAssocFrameworkProvHost |
| DbxSvc.exe | 12428 | Running | SYSTEM | 00 | 1,952K | Dropbox Service |
| Dropbox.exe | 16040 | Running | PC1 | 00 | 120,836K | Dropbox |
| dwm.exe | 1204 | Running | DWM-7 | 00 | 23,288K | Desktop Window Manager |
| explorer.exe | 5516 | Running | PCI | 00 | 30,128K | Windows Explorer |
| GameBarPresenceWr.... | 6620 | Running | PCI | 00 | 1,368K | Gamebar Presence Writer |
| GameCom780.exe | 460 | Running | PC1 | 00 | 2,504K | GameCom780 |
| GameOverlayUI.exe | 15908 | Running | PC1 | 00 | 8,308K | gameoverlayui.exe |
| GfExperienceService | 2796 | Running | SYSTEM | 00 | 3,120K | NVDIAGeForceExpService |
| IAStorDataMgrSvc/exe | 11752 | Running | SYSTEM | 00 | 18,488K | IAStorDataSvc |
| ITSMAgent.exe | 12040 | Running | PC1 | 00 | 2,360K | ITSMAgent.exe |
| ITSMService.exe | 2852 | Running | SYSTEM | 00 | 15,304K | ITSMService.exe |
| jhi_service.exe | 7812 | Running | SYSTEM | 00 | 1,288K | Intel®DynamicAppLoaderInt.. |
| launcher_service.exe | 1316 | Running | SYSTEM | 00 | 3,172K | Remote Mgmt/MonitoringCom |

User association of running processes over Windows Task Manager on Windows 10

FIG. 2C

| Windows Task Manager | | | | |
|---|---|---|---|---|
| File  Options  View  Help | | | | |
| Applications \| Processes \| Services \| Performance \| Networking \| Users | | | | |
| Image Name | User Name | CPU | Memory (Private..) | Description |
| atieclxx.exe | SYSTEM | 00 | 3,384K | AMD External Events Client Module |
| atiesrxx.exe | SYSTEM | 00 | 2,316K | AMD External Events Service Module |
| audiodg.exe | LOCAL... | 00 | 10,996K | Windows Audio Device Graph Isolation |
| btplayerctrl.exe*32 | User | 00 | 2,452K | Bluetooth Media Player Controller |
| cavwp.exe | SYSTEM | 00 | 11,092K | COMODO Client-Security |
| chrome.exe*32 | User | 00 | 57,960K | Google Chrome |
| chrome.exe*32 | User | 00 | 37,260K | Google Chrome |
| chrome.exe*32 | User | 00 | 1,708K | Google Chrome |
| chrome.exe*32 | User | 00 | 168,496K | Google Chrome |
| chrome.exe*32 | User | 00 | 92,724K | Google Chrome |
| chrome.exe*32 | User | 00 | 215,688K | Google Chrome |
| chrome.exe*32 | User | 00 | 58,440K | Google Chrome |
| cistray.exe | User | 00 | 2,528K | COMODO Client-Security |
| cmdagent.exe | SYSTEM | 00 | 18,872K | COMODO Client-Security |
| conhost.exe | SYSTEM | 00 | 1,812K | Console Window Host |
| conhost.exe | SYSTEM | 00 | 1,812K | Console Window Host |
| conhost.exe | SYSTEM | 00 | 1,812K | Console Window Host |
| CptService.exe*32 | SYSTEM | 00 | 1,640K | Zoom Sharing Service |
| csrss.exe | SYSTEM | 00 | 2,112K | Client Server Runtime Process |
| csrss.exe | SYSTEM | 00 | 8,164K | Client Server Runtime Process |
| DbxSvc.exe | SYSTEM | 00 | 2,500K | Dropbox Service |
| Devmonsrv.exe*32 | SYSTEM | 00 | 3,268K | Bluetooth Device Monitor |
| Dllhost.exe*32 | User | 00 | 37,424K | COM Surrogate |
| Dropbox.exe*32 | User | 00 | 127,448K | Dropbox |

☑ Show processes from all users

Processes: 129     CPU Usage 41%     Physical Memory 50%

User association of running processes over Windows Task Manager on Windows 7

FIG. 2D

AUTO-CONTAINMENT OF GUEST USER APPLICATIONS

CROSS REFERENCE TO RELATED APPLICATIONS

This application claims benefit of and priority to U.S. Provisional Application Ser. No. 62/477,413 filed on Mar. 27, 2017, incorporated by reference herein in its entirety.

BACKGROUND

Some of the customer environments like print shops, public internet access location (lounges, hotels, internet cafes, labs, hospitals), etc, require end users to access to the endpoint and download, transfer files and use applications they need for a limited period of time.

It has been a struggle to provide necessary access and make necessary tools available together with decent security on endpoints. By the nature of the user needs and behaviors, end users need to freely download files and install new applications or use available ones with almost unlimited access. These computers are very vulnerable to intentional infections like Keylogger, Trojan or data stealer as well as unintentional drive by download attacks and etc.

One of the old methods of protection from the threat vector is to install regular endpoint protection solutions to detect and prevent those kinds of attacks on run-time (A group). Another method could be keeping a system image to be restored at the end of each session like the product "Deep Freeze" offers (B group). These products require administrative support to create a snapshot or image before and let the user make the changes during the session. At the end of the session they require endpoint to be restored to the image or snapshot. Other approaches (C group) try to detect another sign by other layers later on the kill chain for the same attack vectors.

However, these approaches are ineffective since current security solution are not fine-tuned to be run on a hostile environment where end user might intentionally and unintentionally expose the system to attacks with high access options and various file transfer capability (A group). Additionally, security solutions are not designed to disable session persistence which means all or at least some of the changes done by users will be kept on system and would be available for next sessions, users. This would allow persistent threats to be long lived on those endpoints once infected (A group). Access to these files and information might create legal problems because of exposing private information that is left on previous sessions to other users. There were law suits specifically about this case before on the industry (A group). Disadvantages for the B group of methods are the following. These solutions require administrative support to create an image on computers to be used as initial state for users. It creates a managerial burden to make and maintain the right image with right applications, versions on endpoints. These solutions require a downtime for restore operation to be completed. Also solutions will not allow to run both admin and guest user together on the same computer with different access types (persistent and non-persistent). They will not allow (virtual) session persistence on guest and/or specified user account if needed. They might not allow administrator to optionally configure any location as shared storage where saved data can be persistent and accessible by permanent sessions. And finally they might not allow administrator to optionally configure any application to run on persistent mode if desired in parallel with non-persistent session.

C group solutions depend on detection of these attacks on later stages of kill chain via another security layer. However, there is no guarantee that attacks will be detected and thus it weakens the layered approach to security.

Thus there is a need in new system and method for implementation of advanced endpoint protection solution for different customer needs.

SUMMARY OF INVENTION

The current invention is a method and system for providing security on endpoints which are used on an environment where temporary user access is needed without any session persistence. It is basically containing all the applications (executable files) automatically for guest and/or any other specified users or account types on endpoints.

The present invention aims to auto-contain all applications that are run by a guest (or any other account type like regular user or administrator user) or/and specified user account on the endpoint. By running these applications inside a secure container automatically, the execution of file will be isolated from other system applications and if any infections occur computer will be protected. Auto containment would enable user to interact with the file (application) as usual but would also protect the user and computer from any changes on real system files and configurations. At any time or automatically at the end of the user session, container can be reset and any changes made by user during that session can be removed.

Endpoint security solutions and end users benefit from this methodology based on the following advantages. Here, the container is already engineered and hardened to contain the malicious attacks inside itself and protect the host system from any kind of infections, so it is the tailored environment to work with where end user might intentionally and unintentionally expose the system to attacks with high access options and various file transfer capability.

Container is designed as a temporary environment to run any application in an isolated system usage. It can be reset to remove any changes made inside the session. This prevents any threat from being persistent on those endpoints even if they are infected.

Since all data which is created and changes done could be reset anytime and would be reset at the end of each user session, it eliminates any access risk to these temporary files and information. It also eliminates the risk of legal problems due to expose private information that is left on previous sessions to other users.

With this new solution administrator does not need to create a static image on computers. Any application they install to their own account could be available to other users if they prefer to and end-users also can install any additional application during the session if they need to. Administrator does not need to go through the managerial burden of creating and maintaining the right image with right applications, versions on endpoints.

Containment solution of this invention does not require down time or restart to be reset. It can be reset any time with one click or command. This would improve the operational efficiency. Current containment technology could run contained and not contained applications side by side. So non-restricted user and guest user can both work on the endpoint together with different access types (persistent and non-persistent). This containment technology is also able to allow isolated persistence for guest and/or specified user account if needed.

Administrator is able to allow optionally any location (on the same or different disk/path) as shared storage where saved data can be persistent and accessible by permanent sessions. This technology allows administrator to optionally configure any application to run on persistent mode if desired inside the non-persistent session and/or in parallel with non-persistent session.

This methodology also enables regular users to have a sandbox environment where they can switch to guest or specified user and can try anything without the fear of infection or system damage on their own endpoints. This provides ability to explore and learn with trials to end users.

With the present invention, there is a method for providing endpoint protection of a system, comprising extracting and checking by a security client, the user information of file execution before an application is launched to decide if the file execution is requested by a guest and/or pre-configured user accounts. The method then creates a secure container by the security client if the guest and/or pre-configured user accounts were found, and isolates, by the security container, all of the resource usage of the application from the remainder of the system and user applications.

The method further includes that the application is checked by the security client and launched in the security container, with the method further having the steps of launching the application and triggering the security client. Then, checking is performed by the security client, the user information of the file execution. The security client receives the user information and checks if the user information is matching with the guest and/or pre-configured user accounts. Then the method of the present invention checks, by the security client, if there is any exclusion rule that is applicable to requested process in case of any matches. The security client creates the secure container and provides the execution resources within the secure container if there is no exclusion rule. The method then runs the application within the secure container and runs the application as a normal executable on the endpoint with system default settings and access, if the user information is not matching with the guest and/or pre-configured user accounts. The method further includes where the step of running the application as a normal executable on an endpoint with system default settings and access if the user information is matching but there is an exception for the requested process.

The method of the present invention includes the secure container having an application level to include guest and/or specified user applications, an operating system level which includes virtual registry, virtual file system and virtual OS core; and a hardware level which includes hardware equipment, virtualization, enhancements. The secure container provides an option to enable or disable auto containment of all applications associated by a specific account type selected from the group comprising guest, user, administrator, or a specified user account. Further the secure container provides an option to enable or disable auto reset of containment at the end of a user session.

The method of the invention further includes checking, by the security client, the user session end information and obtaining by the security client, the user session end information. The method then ends the user session and the security client kills all of the running applications inside the secure container. The security client then erases any change logs kept on virtual resources; and resets to an initial state. The method of the present invention includes an embodiment where the user information of the file execution is checked by the security client to determine if any parent process of the application is launched by guest account and/or pre-configured user account(s). Further, the method includes where the secure container is created by the security client if any parent process launched by the guest(s) and/or pre-configured user account(s) is located.

BRIEF DESCRIPTION OF DRAWINGS

FIG. 2C is a depiction presenting the process of the invention.

FIG. 2D is a depiction presenting the process of the invention.

DETAILED DESCRIPTION

The present invention discloses a method and system for advanced endpoint protection of a computer system for specific customer needs.

Figure 1:
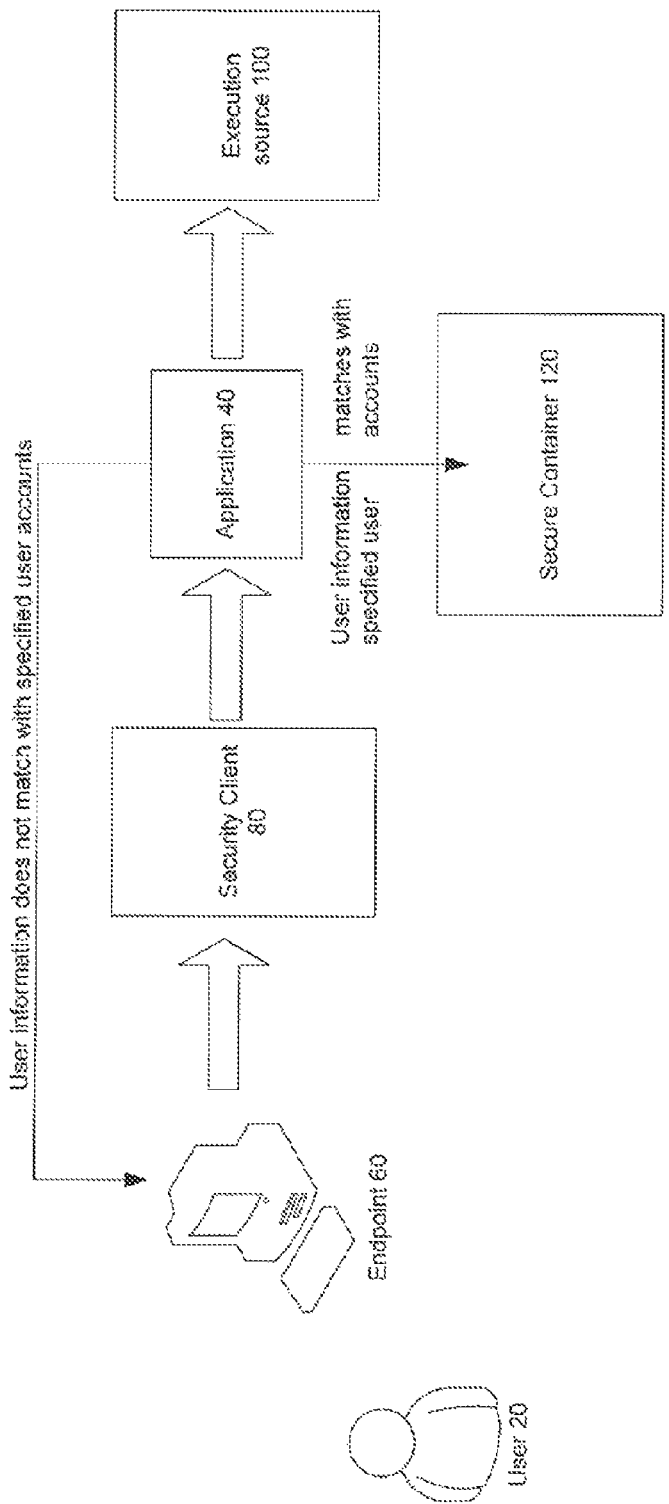
FIG. 1 is a depiction of general scheme of the invention.
Figure 2A:
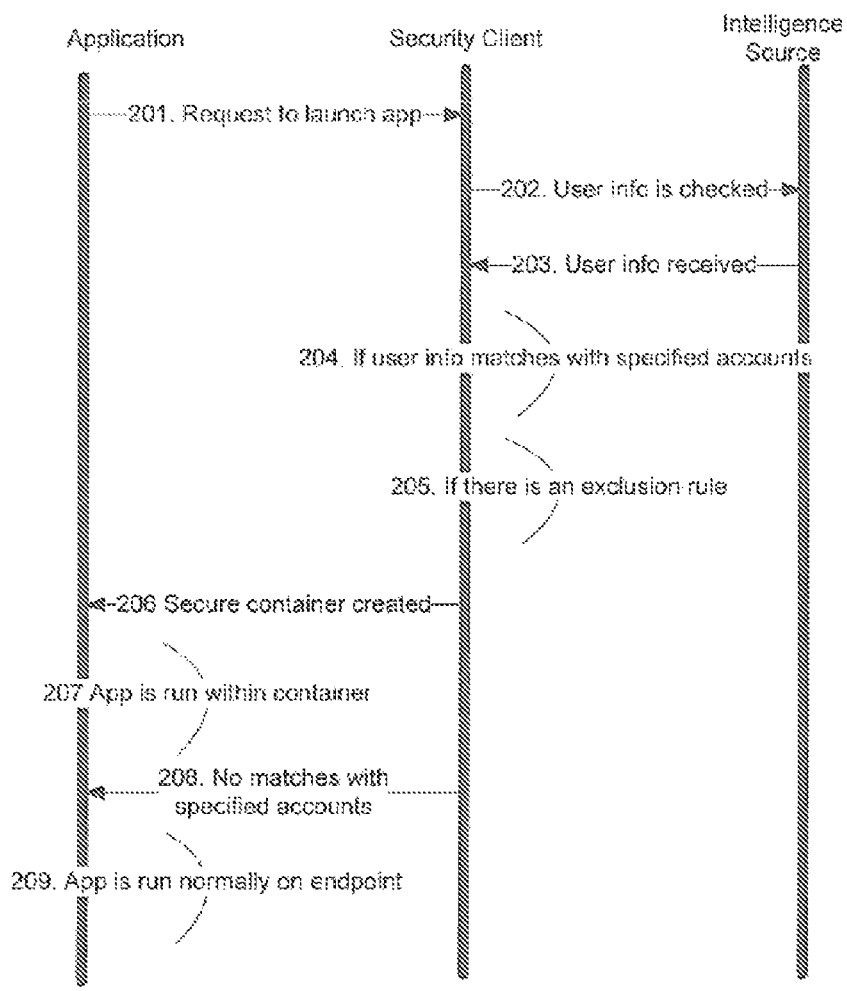
FIG. 2A is a diagram presenting the process of the invention.
Figure 2B:
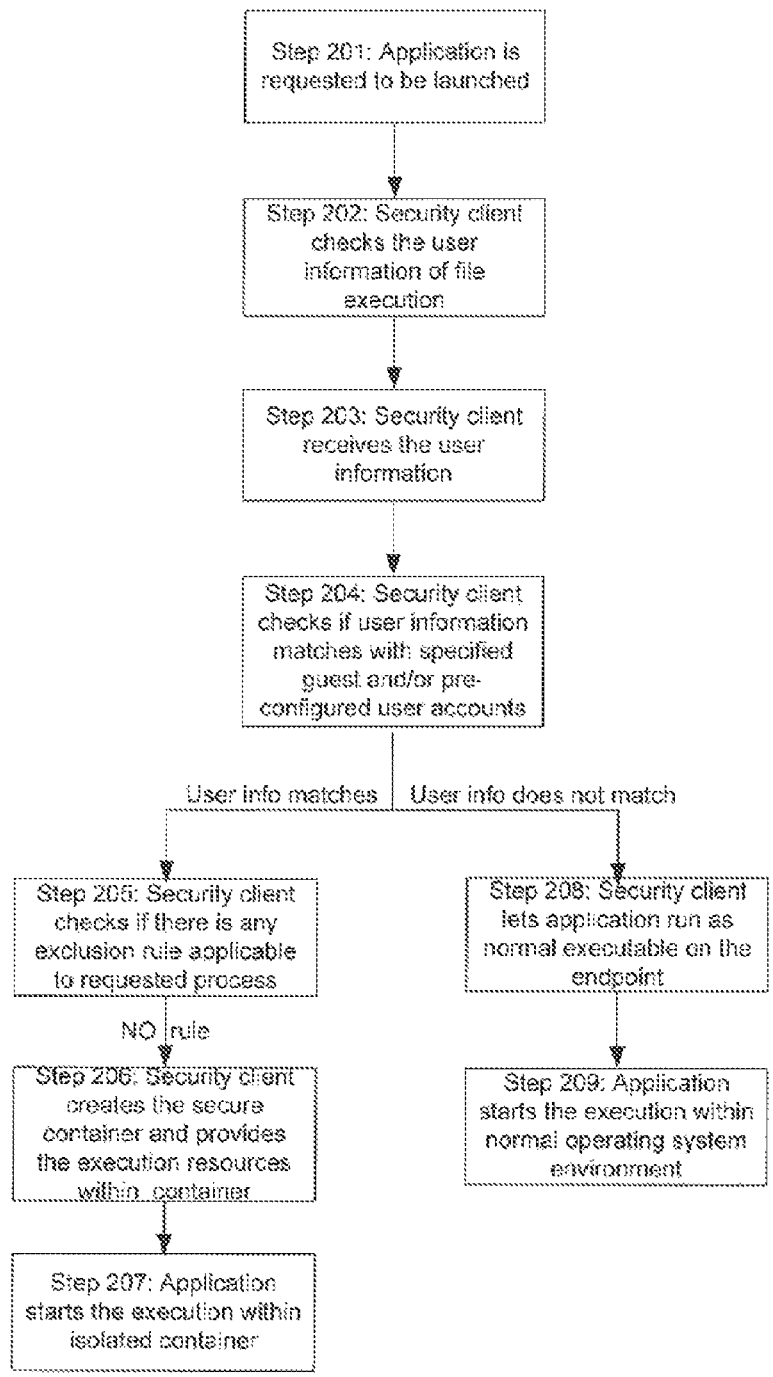
FIG. 2B is a flowchart presenting the process of the invention.

FIG. 1 shows depiction of general scheme of the invention. There is a user 20 that requests the execution of application 40 on any endpoint 60. Before application 40 is launched user information of file execution is extracted from execution source 100 and checked by security client 80 to decide if file execution is requested by guest and/or pre-configured user accounts or any of the parent process is launched by guest and/or pre-configured user account. In case security client 80 finds matching to these accounts it creates secure container 120 to isolate all the resource usage of that application from the rest of the system and user applications.

FIGS. 2A, 2B, 2C, and 2D show the diagram, flowchart and depictions presenting the process of the invention. In step 201 application 40 is requested to be launched and triggers the security client 80. In step 202 security client 80 checks the user information of file execution (parent process user relation if it is a child process). In step 203 security client 80 receives the user information. In step 204 security client 80 checks if the user information is matching with specified guest and/or pre-configured user accounts. If yes, security client 80 checks if there is any exclusion rule that is applicable to requested process, step 205. If there is no exclusion rule, security client 80 creates the secure container 120 and provides the execution resources within new container or if there is an existing container, uses that one and provides the execution resources within existing container, step 206. In step 207 application 40 starts the execution within isolated container 120. In step 208 if the user information is not matching with specified guest and/or preconfigured user accounts, or matching but there is an exception for that process, security client 80 lets application 40 run as normal executable on the endpoint 60 with system default settings and access. In step 209 application 40 starts the execution within normal operating system environment.

Figure 3:
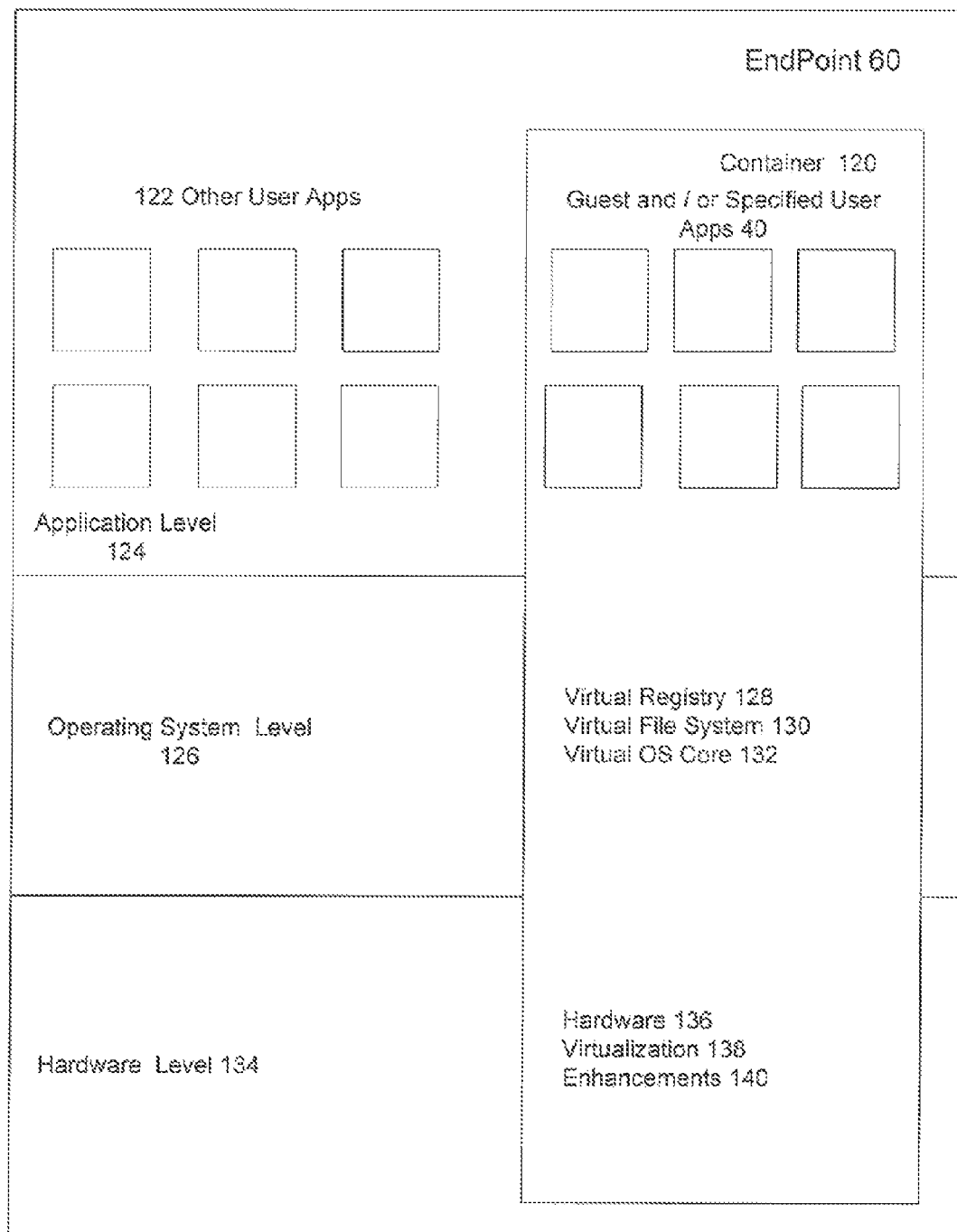
FIG. 3 is a diagram of invention where endpoint with secure container is presented.

FIG. 3 is a diagram of one embodiment of the invention where endpoint 60 with secure container 120 is presented. Application level 124 of secure container 120 comprises guest and/or specified user applications 40. There will be configured the following menu options. The first is to enable/disable auto containment of all applications 40 associated by specific account type (like guest, user, administrator) or specified user account. The second option is to enable/disable auto reset of containment at the end of the user session. Operating system level 126 of secure container 120 comprises virtual registry 128, virtual file system 130 and virtual OS core 132. Hardware level 134 of secure container 120 comprises hardware equipment 136, virtualization 138, enhancements 140.

Figure 4A:
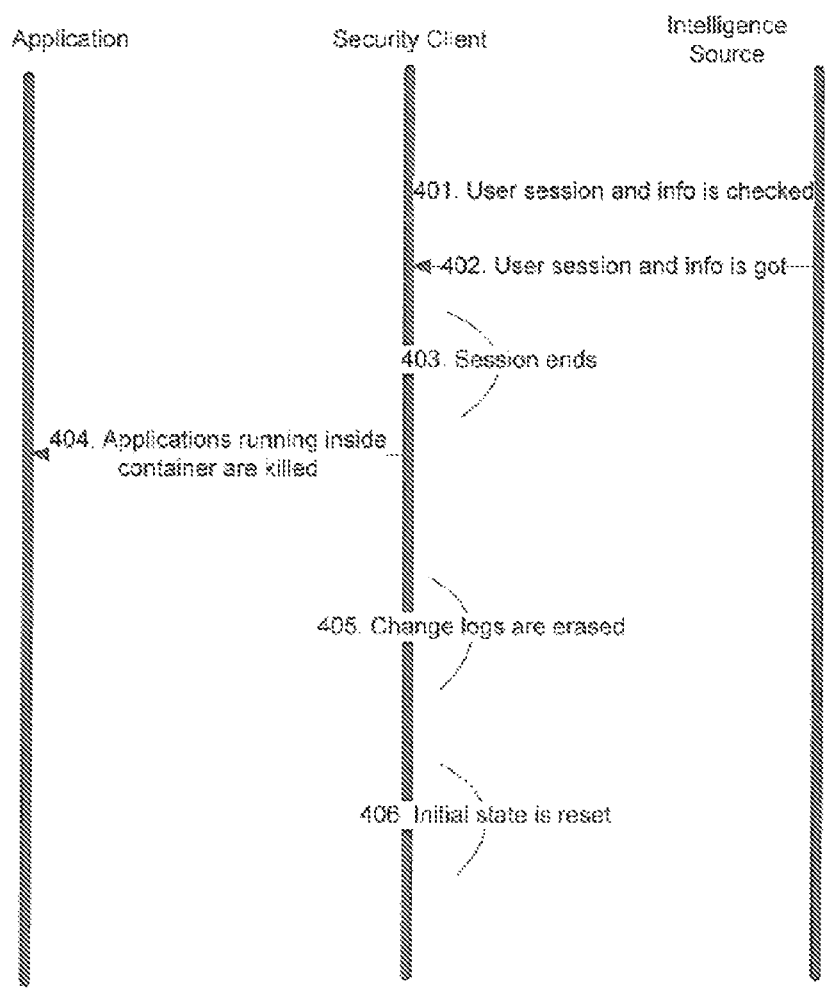
FIG. 4A is a diagram of the final process of invention algorithm.
Figure 4B:
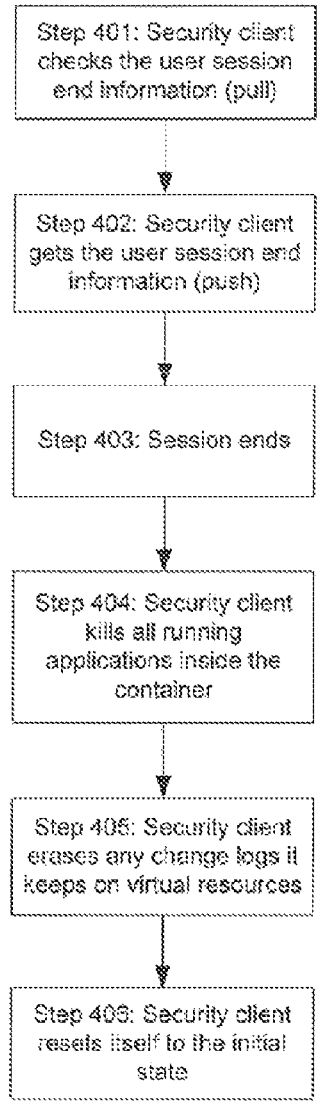
FIG. 4B is a flowchart of the final process of invention algorithm.

FIGS. 4A and 4B represent diagram and flowchart of the final process of invention algorithm. In step 401 security client 80 checks the user session end information (pull). Or in step 402 security client 80 gets the user session end information (push). In step 403 session ends. In step 404 security client 80 kills all running applications 40 inside the container 120. In step 405 security client 80 erases any change logs it keeps on virtual resources. In step 406 security client 80 resets itself to the initial state.

Figure 5:
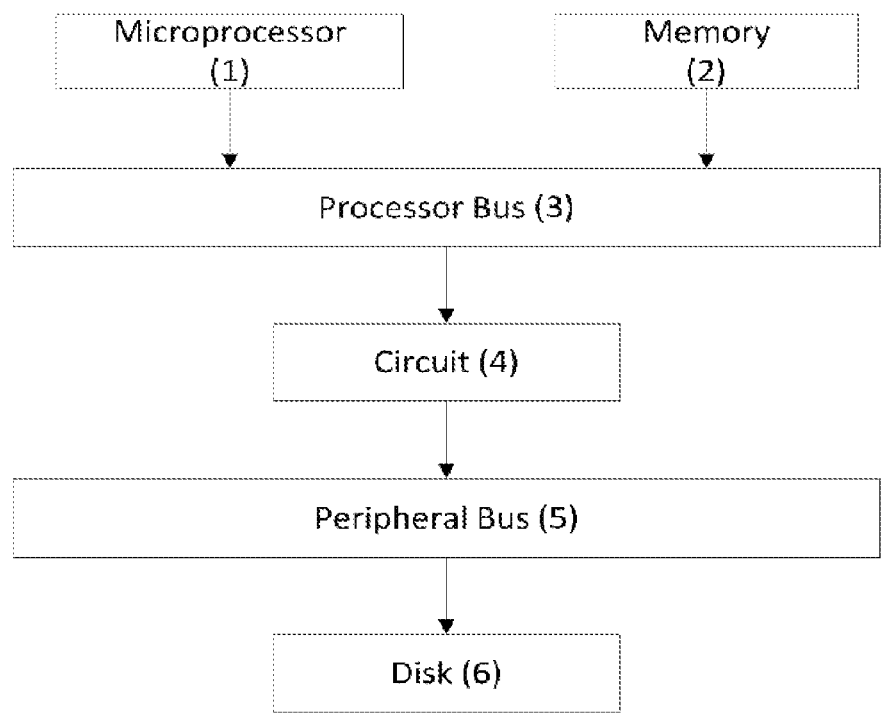
FIG. 5 is a schematic illustration of the connections of a computing system.
Figure 6:
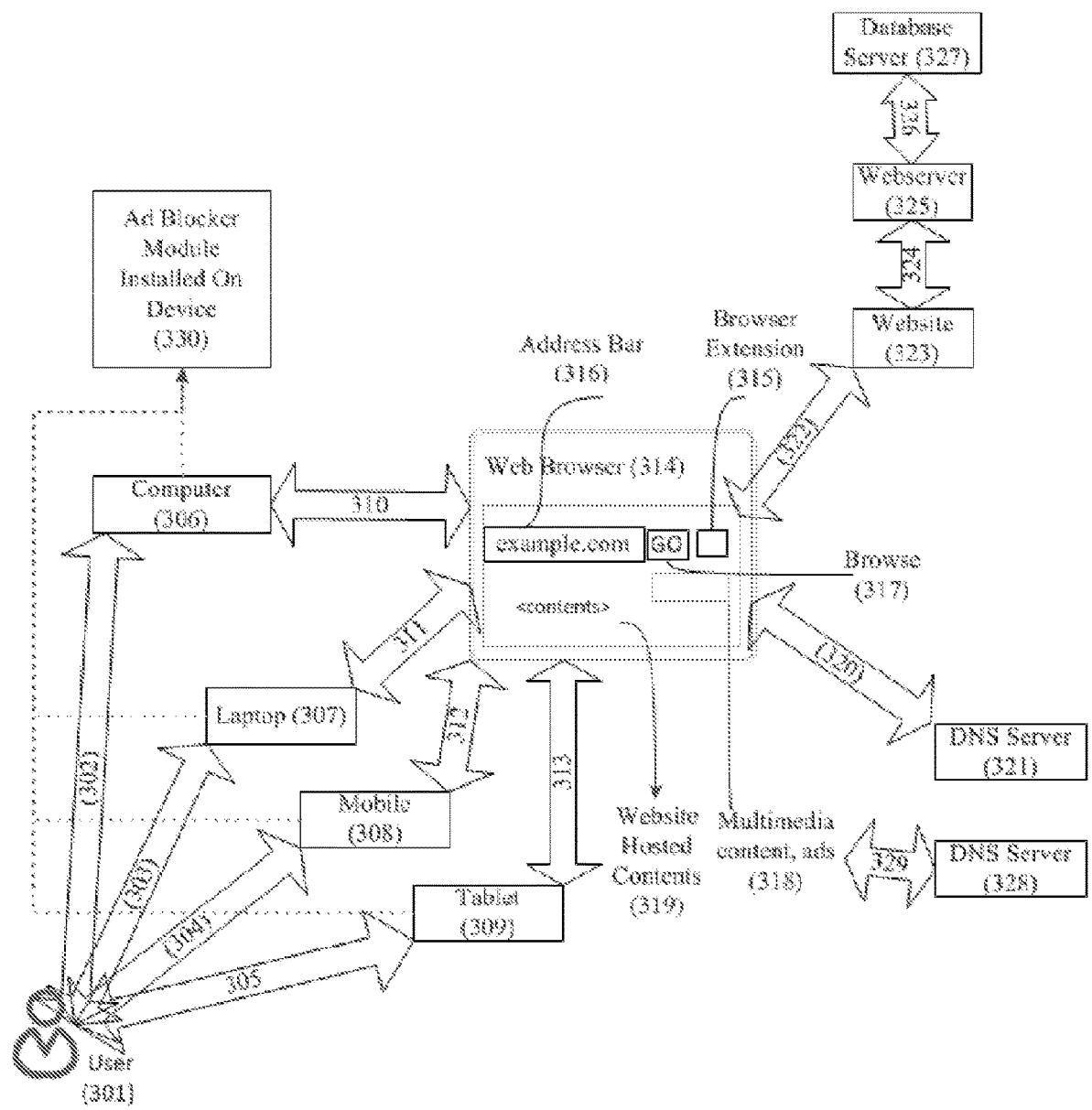
FIG. 6 is a schematic illustration showing how a user browses Internet and how different components act together to complete that browsing experience.
Figure 7:
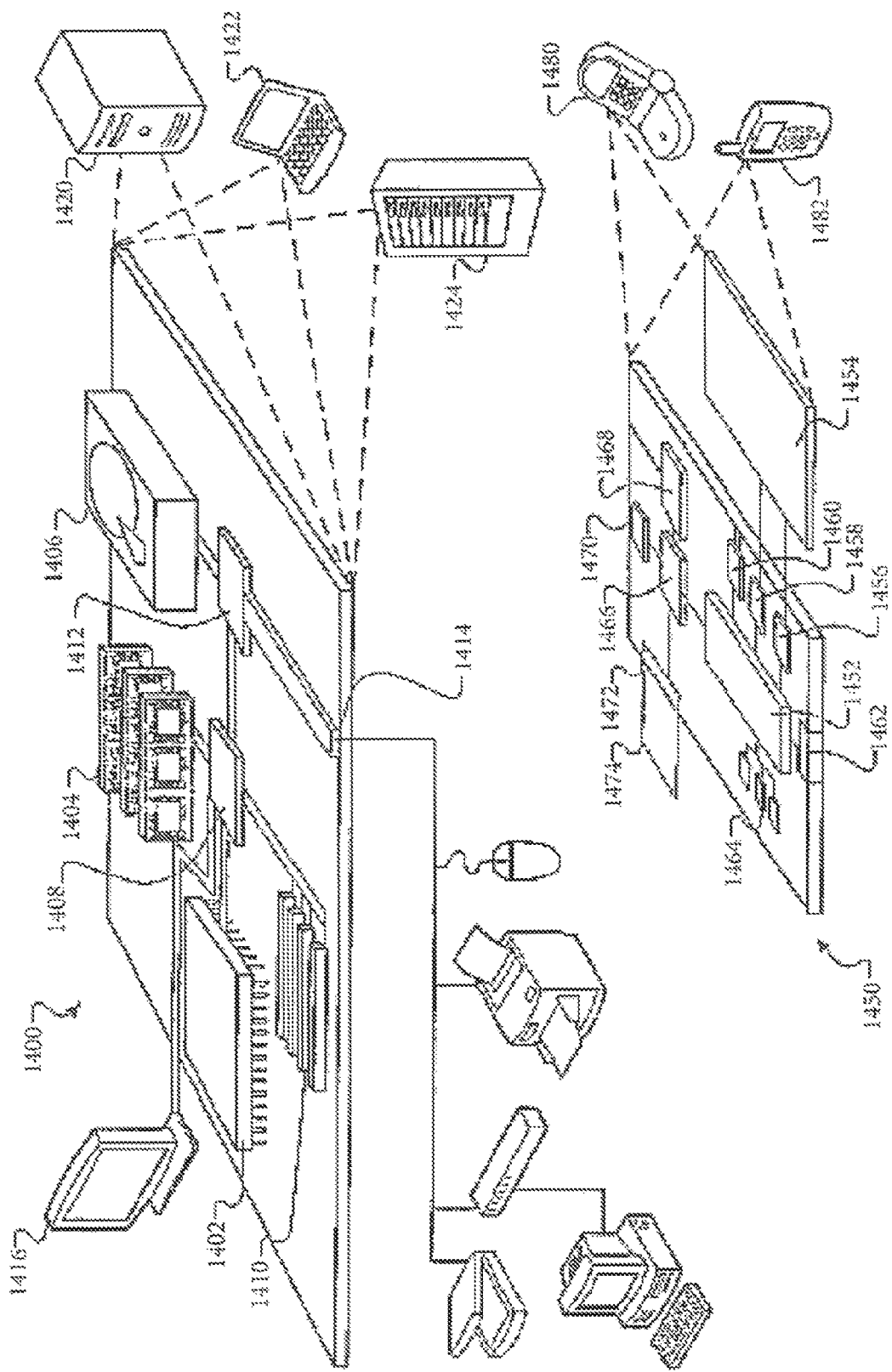
FIG. 7 is an illustration of a computer and mobile devices and their components.

The present invention is used with the following FIGS. 5, 6, and 7 of computer systems, components, and internet access. FIG. 5 illustrates a system of a computer or device which includes a microprocessor 1 and a memory 2 which are coupled to a processor bus 3 which is coupled to a peripheral bus 5 by circuitry 4. The bus 5 is communicatively coupled to a disk 6. It should be understood that any number of additional peripheral devices are communicatively coupled to the peripheral bus 5 in embodiments of the invention. Further, the processor bus 3, the circuitry 4 and the peripheral bus 5 compose a bus system for computing system 10 in various embodiments of the invention. The microprocessor 1 starts disk access commands to access the disk 6. Commands are passed through the processor bus 3 via the circuitry 4 to the peripheral bus 5 which initiates the disk access commands to the disk 6. In various embodiments of the invention, the present system intercepts the disk access commands which are to be passed to the hard disk.

FIG. 6 is a description of how communication works when the web is browsed and shows that a user (301) can use computer (306), laptop (307), mobile (308) or a tablet (309) to launch a web browser (314) installed on that specific device to browse a specific website (323). The user can enter an address of some chosen web site on the address bar (316) and press a browser specific option to indicate to the browser to browse, as shown in FIG. 5 via button "Go" (317). After a user presses a browser specific option to navigate to a given web page as shown in FIG. 5 via button Go (317), web browser (314) first connects to domain name server (321) as configured in that device to resolve the web site domain to the IP address. Any user initiated request in browser page goes through to web site (323) as show via flow arrow 322 and then to web server (325) where web site (323) is hosted. Web server (325) in turn may connect to one or more database server(s) (327) to return specific user requested contents back to web browser (314). Multimedia content and advertisements (318) are received from server 328 as shown by flow arrow 329.

In FIG. 6, browser extension (315) is shown to be installed in web browser that has capability to block any outgoing web request; and at the same time can block any html element present on web page using some pre-defined blacklist of outgoing URLs. At the same time a device may also be using one or other ad blocker (330) installed on device that can block any outgoing call irrespective of application calling and thus such an application can block ad requests originating from any application including web browsers. Considering such ad blockers (330) are installed on device, they have complete access to all code passed onto web page and can inject any specific piece of html code that can block any HTML elements present on web page. Thus depending on device setup, a web request may be blocked at browser level via ad blocker installed as browser extension (315) or may be blocked at network level using software module installed on device at network level and acting as ad blocker (330).

FIG. 7 shows an example of a computer device 1400 and a mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, tablet, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extend to any novel one, or any novel combination, of the features disclosed in this specification (including any accompanying claims, abstract and drawings), or to any novel one, or any novel combination, of the steps of any method or process so disclosed.

What is claimed is:

1. A method for providing endpoint protection of a system, comprising:
    extracting and checking by a security client user information of file execution before an application is launched to decide if said file execution is requested by guest user accounts in an environment where temporary user access is needed without session persistence;
    creating a secure container by said security client if said guest user accounts were found; and
    isolating, by said security container, all resource usage of the application from the remainder of the system and user applications and running said application inside said secure container automatically; and
    resetting said security container without downtime to remove changes by said guest user during a session and without creating and maintaining a right image with said application and version of said application on said endpoint.

2. The method according to claim 1, wherein said application is checked by said security client and launched in said security container further comprising:
    launching said application and triggering the security client;
    checking, by said security client, the user information of said file execution;
    receiving by said security client, the user information;
    checking by said security client if the user information is matching with said guest user accounts;
    checking by said security client if there is any exclusion rule that is applicable to requested process in case of any matches;

creating by said security client, the secure container and provide the execution resources within said secure container if there is no exclusion rule;

running said application within said secure container; and running said application as a normal executable on the endpoint with system default settings and access if the user information is not matching with said guest user accounts.

3. The method according to claim 2 wherein said step of running said application as a normal executable on an endpoint with system default settings and access if the user information is matching but there is an exception for said requested process.

4. The method according to claim 1, wherein said secure container further comprises:

having an application level of said secure container include guest user applications;

having an operating system level of said secure container include virtual registry, virtual file system and virtual OS core; and having hardware level of secure container include hardware equipment, virtualization, enhancements;

said secure container providing an option to enable or disable auto containment of all applications associated by a specific account type selected from the group comprising guest, user, administrator, or a specified user account and;

said secure container providing an option to enable or disable auto reset of containment at the end of a user session.

5. The method of claim 4 wherein said secure container further comprises:

having an application level of said secure container include specified user applications.

6. The method according to claim 1, further comprising:

checking, by the security client, the user session end information;

obtaining by the security client, the user session end information;

ending said user session;

killing by said security client, all running applications inside the secure container;

erasing by said security client any change logs kept on virtual resources; and resetting to an initial state.

7. The method of claim 1 wherein said user information of said file execution is checked by said security client to determine if any parent process of said application is launched by said guest user account.

8. The method of claim 1 wherein said secure container is created by said security client if any parent process launched by said guest user account is located.

9. The method of claim 1 further comprising said file execution is requested by pre-configured user accounts in an environment where temporary user access is needed without session persistence and creating a secure container by said security client if said pre-configured user accounts were found.

* * * * *